(12) United States Patent
Wu

(10) Patent No.: US 7,757,820 B1
(45) Date of Patent: Jul. 20, 2010

(54) ROTOR BRAKE

(75) Inventor: Chin Chang Wu, Taiping (TW)

(73) Assignee: Cheng Hsiung Wei, Kaohsiung (TW)

( * ) Notice: Subject to any disclaimer, the term of this patent is extended or adjusted under 35 U.S.C. 154(b) by 0 days.

(21) Appl. No.: 12/604,377

(22) Filed: Oct. 22, 2009

(51) Int. Cl.
*B62K 21/18* (2006.01)
(52) U.S. Cl. .................. 188/24.11; 74/551.1; 74/502.4
(58) Field of Classification Search .............. 188/24.11, 188/24.15, 24.16, 24.21, 24.22; 74/502.4, 74/502.6, 551.1
See application file for complete search history.

(56) References Cited

U.S. PATENT DOCUMENTS 5,605,076 A * 2/1997 Wu ........................... 74/551.1
5,615,585 A * 4/1997 Chi ........................... 74/551.1
6,205,635 B1 * 3/2001 Scura ........................ 29/407.1

* cited by examiner

*Primary Examiner*—Christopher P Schwartz

(57) ABSTRACT

A rotor brake has a front tube, an upper bearing assembly, a braking device, at least one upper brake cable and at least one spring. The front tube has a top and a tube opening defined in the top of the front tube. The upper bearing assembly is mounted securely on the top of the front tube. The braking device is mounted in the tube opening and has a sliding bracket and an upper rotator. The sliding bracket is slidable and rotatable. The upper rotator is rotatably mounted around the sliding bracket. The at least one upper brake cable is mounted through the upper bearing assembly and is embedded in the upper rotator. The at least one spring is correspondingly mounted compressibly around the at least one upper brake cable and abuts the upper bearing assembly and the upper rotator.

6 Claims, 4 Drawing Sheets

ROTOR BRAKE

BACKGROUND OF THE INVENTION

1. Field of the Invention

The present invention relates to a brake assembly for a bike, and more particularly to a rotor brake.

2. Description of Related Art

Rotor brakes, also known as detanglers, have been widely used for bicycles for years. The rotor brake is capable of unlimited rotation without brake cable entanglement.

A biker needs to change motions quickly for doing various tricks in a short time, so brake cables must return to original positions quickly. However, the conventional rotor brake has a delayed return time.

To overcome the shortcomings, the present invention tends to provide a rotor brake to mitigate the aforementioned problems.

SUMMARY OF THE INVENTION

The main objective of the invention is to provide a rotor brake with quick brake cable return.

A rotor brake has a front tube, an upper bearing assembly, a braking device, at least one upper brake cable and at least one spring. The front tube has a top and a tube opening defined in the top of the front tube. The upper bearing assembly is mounted securely on the top of the front tube. The braking device is mounted in the tube opening and has a sliding bracket and an upper rotator. The sliding bracket is slidable and rotatable. The upper rotator is rotatably mounted around the sliding bracket. The at least one upper brake cable is mounted through the upper bearing assembly and is embedded in the upper rotator. The at least one spring is correspondingly mounted compressibly around the at least one upper brake cable and abuts the upper bearing assembly and the upper rotator.

Other objects, advantages and novel features of the invention will become more apparent from the following detailed description when taken in conjunction with the accompanying drawings.

DETAILED DESCRIPTION OF PREFERRED EMBODIMENT

Figure 1:
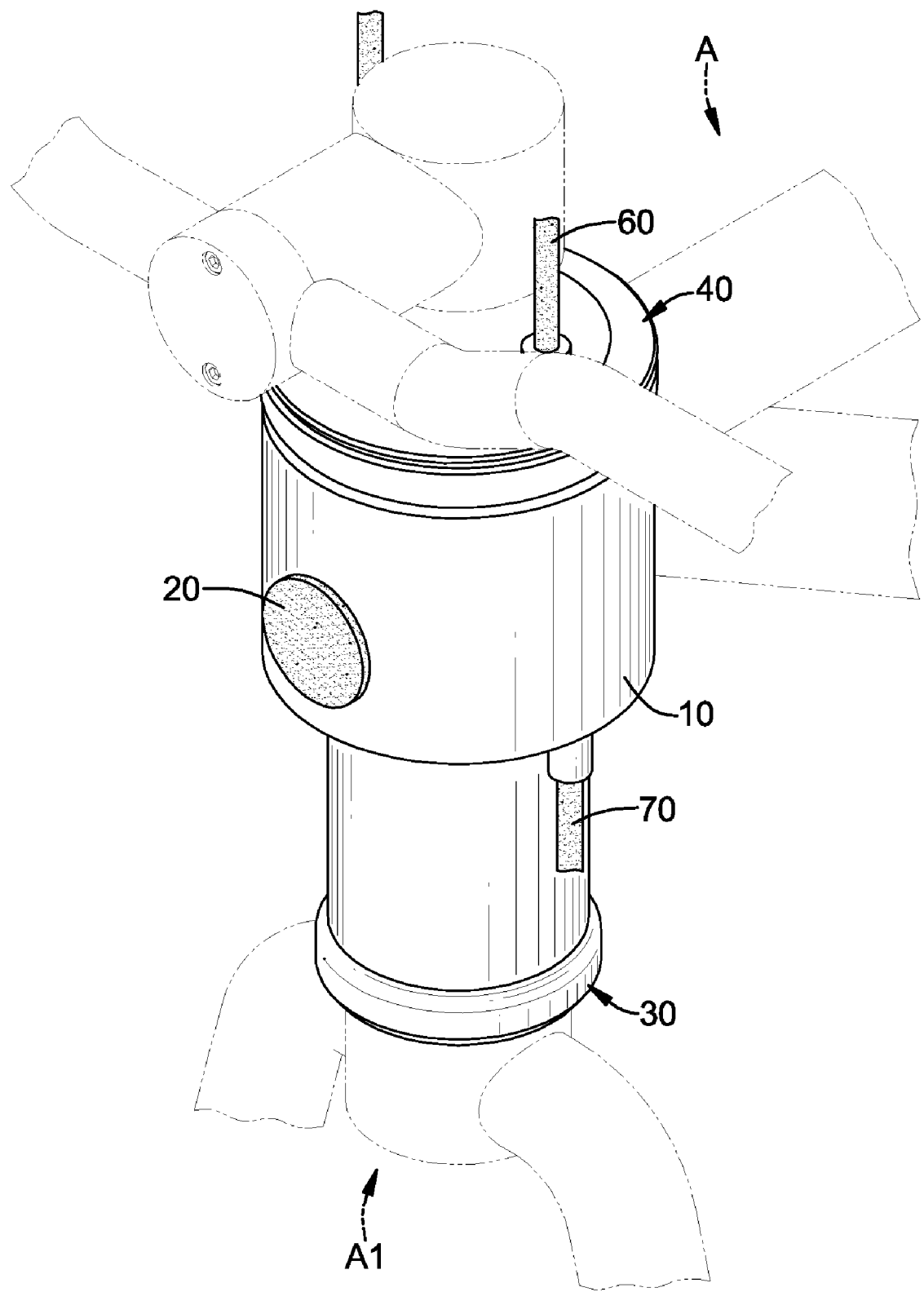
FIG. 1 is an operational perspective view of a rotor brake in accordance with the present invention.
Figure 2:
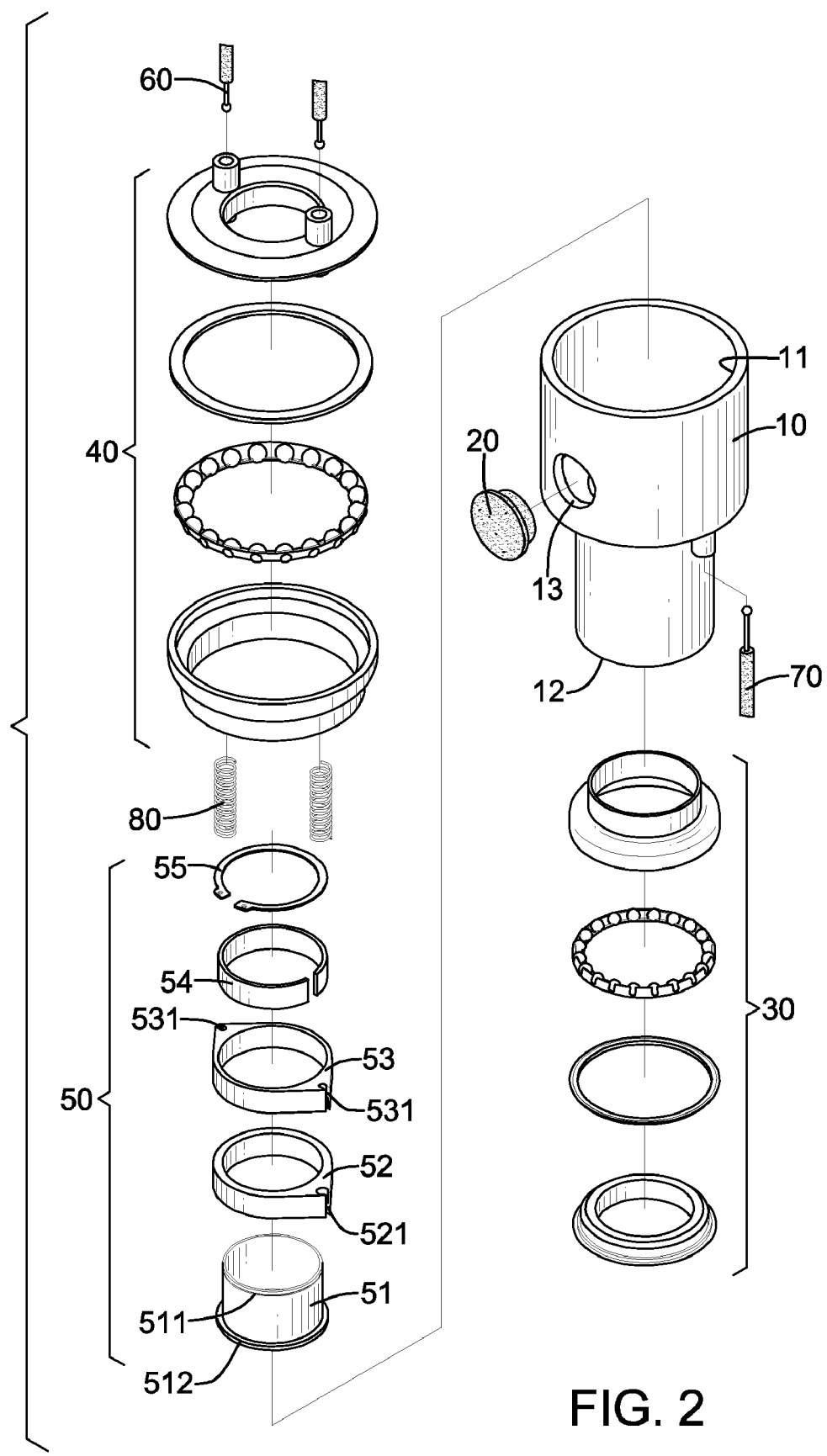
FIG. 2 is an exploded perspective view of the rotor brake in FIG. 1.
Figure 3:
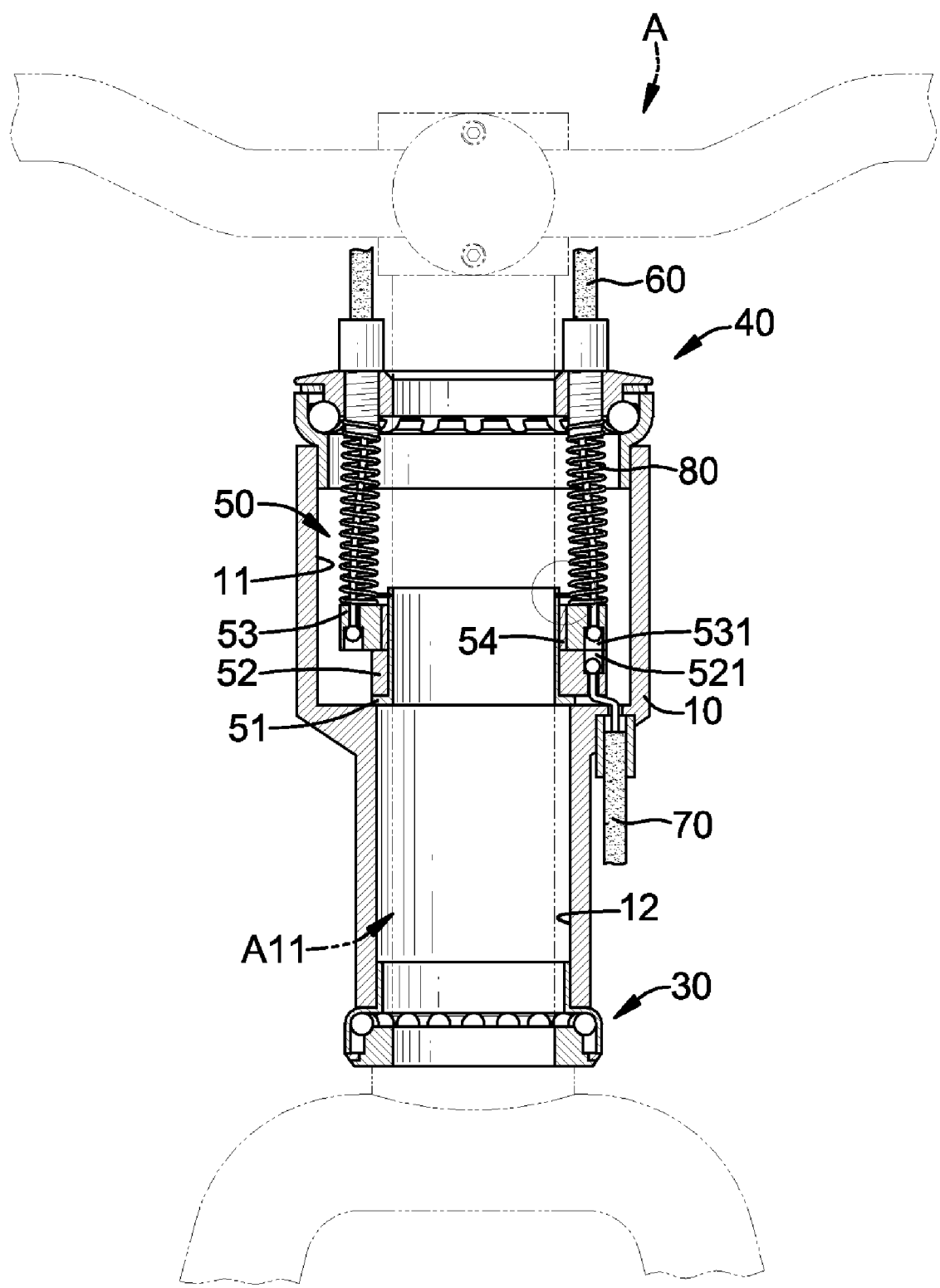
FIG. 3 is a side view in partial section of the rotor brake in FIG. 1.

With reference to FIGS. 1 to 3, a rotor brake in accordance with the present invention is applied to a bicycle, especially a trick bike, comprising a bike frame (A), a front fork (A1) and two brake levers. The structure of the bicycle may be conventional, so detailed description is omitted.

The rotor brake in accordance with the present invention comprises a front tube (10), a plug (20), a lower bearing assembly (30), an upper bearing assembly (40), a braking device (50), two upper brake cables (60), a lower brake cable (70) and two springs (80).

The front tube (10) is mounted securely on the bike frame (A), is mounted around the front fork (A1), is substantially cylindrical and has a top, a bottom, a tube opening (11), a through hole (12) and a maintenance hole (13).

The tube opening (11) is axially defined in the top of the front tube (10) and has a diameter and a bottom. The through hole (12) is axially defined through the bottom of the tube opening (11) and has a diameter. The diameter of the through hole (12) is smaller than that of the tube opening (11). The maintenance hole (13) is radially defined in the front tube (10), communicates with the tube opening (11) and is adjacent to the bottom of the tube opening (11).

The plug (20) is rubber and is mounted securely in the maintenance hole (13).

The lower bearing assembly (30) is mounted securely on the bottom of the front tube (10) and is securely mounted around the front fork (A1) to allow the front fork (A1) to rotate relative to the front tube (10). Preferably, the lower bearing assembly (30) is a ball bearing assembly.

The upper bearing assembly (40) is mounted securely on the top of the front tube (10) and is securely mounted around the front fork (A1) to allow the front fork (A1) to rotate relative to the front tube (10). Preferably, the upper bearing assembly (40) is a ball bearing assembly.

The braking device (50) is mounted in the tube opening (11) and has a sliding bracket (51), a lower rotator (52), an upper rotator (53), a self-lubricant bushing (54) and a C-shaped ring (55).

The sliding bracket (51) is mounted in the tube opening (11) and abuts the bottom of the tube opening (11) beside the through hole (12). The sliding bracket (51) is substantially cylindrical, is slidably and rotatably mounted around the front fork (A1) and has a top end, a bottom end, an outer surface, a bracket groove (511) and a bracket flange (512).

The bracket groove (511) is annular and is defined around the top end of the sliding bracket (51). The bracket flange (512) is annular and protrudes around the bottom end of the sliding bracket (51).

The lower rotator (52) is rotatably mounted around the sliding bracket (51), abuts the bracket flange (512), is annular and has an outer surface and an inlaying groove (521). The inlaying groove (521) is longitudinally defined in the outer surface of the lower rotator (52) and may align with the maintenance hole (13).

Figure 4:
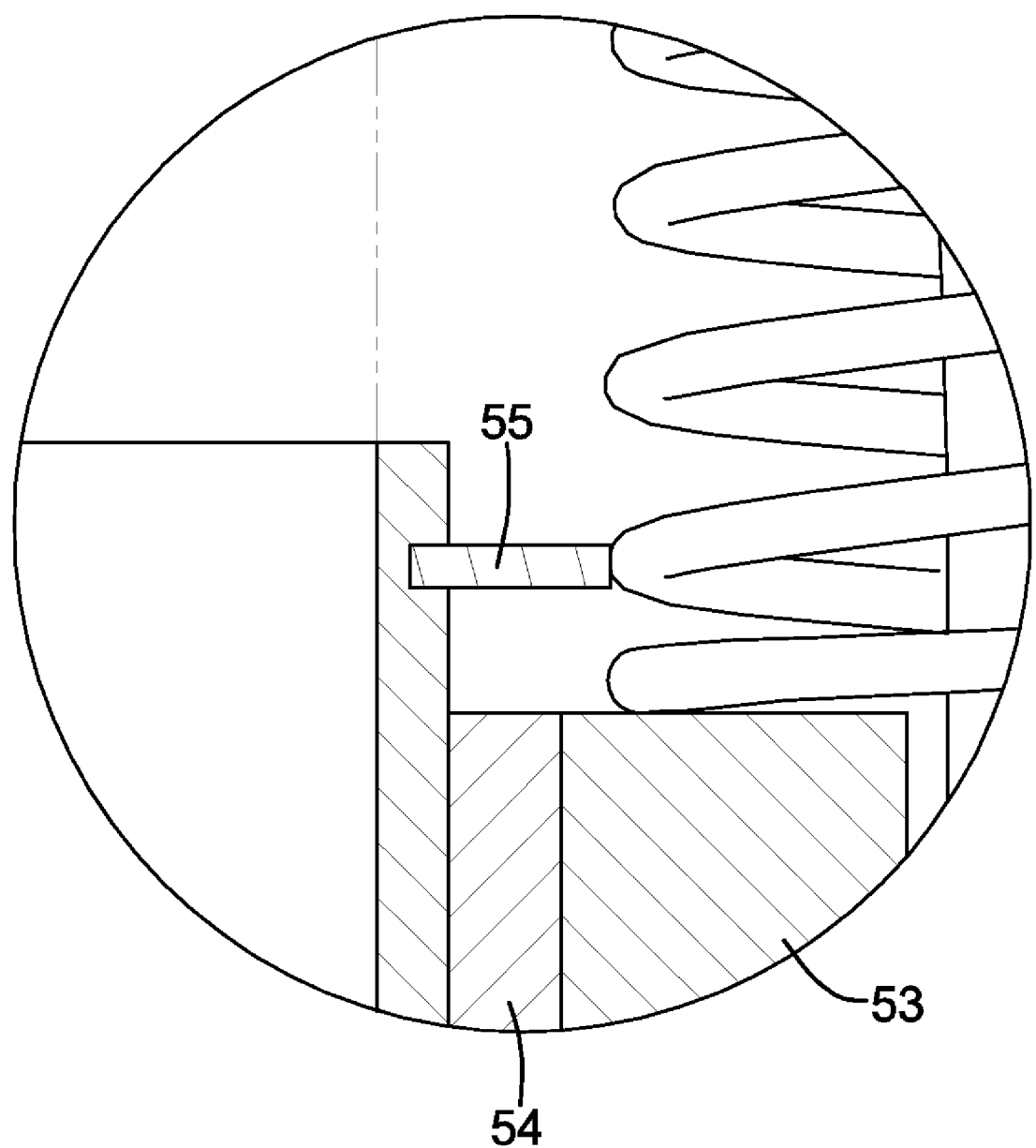
FIG. 4 is an enlarged side view in partial section of the rotor brake in FIG. 3.

With further reference to FIG. 4, the upper rotator (53) is rotatably mounted around the sliding bracket (51) between the lower rotator (52) and the bracket groove (511). The upper rotator (53) is annular and has an outer surface and two embedding grooves (531). The embedding grooves (531) are longitudinally defined in the outer surface of the upper rotator (53) respectively at two ends of a diameter of the upper rotator (53). The embedding grooves (531) may align with the maintenance hole (13).

The self-lubricant bushing (54) is made of polytetrafluoroethylene and is C-shaped. The self-lubricant bushing (54) is mounted around the outer surface of the sliding bracket (51) between the upper rotator (53) and the sliding bracket (51) to smooth relative rotation therebetween.

The C-shaped ring (55) is mounted securely in the bracket groove (511) to confine the rotators (52, 53) between the C-shaped ring (55) and the bracket flange (512).

The upper brake cables (60) are respectively mounted through the upper bearing assembly (40) and are respectively embedded in the embedding grooves (531).

The lower brake cable (70) is mounted through the front tube (10) and is embedded in the inlaying groove (521).

The springs (80) are respectively mounted compressibly around the upper brake cables (60). Each spring (80) has two ends. The ends of each spring (80) respectively abut the upper bearing assembly (40) and the upper rotator (53).

When the brake levers of the bicycle are applied, the upper brake cables (60) are tightened and pulled upward, the springs (80) are compressed and the upper rotator (53) is pulled upward by the upper brake cables (60). With the C-shaped ring (55) confining the upper rotator (53), the upper rotator (53) abuts the C-shaped ring (55) and drives the sliding bracket (51) to slide upward along the front fork (A11). Consequently, the sliding bracket (51) drives the lower rotator (52) to ascend because the bracket flange (512) abuts the lower rotator (52). Therefore, the lower brake cable (70) is pulled upward by the lower rotator (52).

When the brake levers are released, the springs (80) recover and quickly push back the upper rotator (53) to an original position. Consequently, the upper rotator (53) abuts the lower rotator (52) and drives the lower rotator (52) to move downward, so the sliding bracket (51) is driven by the lower rotator (52) to abut the bottom of the tube opening (11). Finally, the brake cables (60, 70) return to original positions quickly because the rotators (52, 53) return to original positions quickly.

When the front fork (A1) is rotated relative to the front tube (10) via the upper bearing assembly (40), the upper brake cables (60) are also rotated with the upper bearing assembly (40) and the front fork (A1) because the upper brake cables (60) are mounted through the upper bearing assembly (40). Since the upper brake cables (60) are embedded in the embedding grooves (531), the upper rotator (53) is rotated relative to the sliding bracket (51). At that time, the lower rotator (52) remains still. Accordingly, a trick can be accomplished without entanglement of the lower brake cable (70). Because of the self-lubricant bushing (54), the upper rotator (53) can rotate smoothly relative to the sliding bracket (51).

From the above description, it is noted that the invention has the following advantages:

1. Quick return of the brake cables (60, 70):

The brake cables (60, 70) can return to original positions quickly because the recovered springs (80) force the upper rotator (53) to move downward. Therefore, the sliding bracket (51) and the lower rotator (52) can also move downward.

2. Smooth rotation:

The self-lubricant bushing (54) that is made of polytetrafluoroethylene can make the upper rotator (53) smoothly rotate relative to the sliding bracket (51).

3. Convenient maintenance

If the brake cables (60, 70) are broken, a biker can pull the brake cables (60, 70) out and replace with new ones via the maintenance hole (13) instead disassemble the present invention.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A rotor brake comprising:
a front tube having
  a top;
  a tube opening axially defined in the top of the front tube; and
  a maintenance hole radially defined in the front tube and communicating with the tube opening;
a plug mounted securely in the maintenance hole;
an upper bearing assembly mounted securely on the top of the front tube;
a braking device mounted in the tube opening and having
  a sliding bracket slidably and rotatably mounted in the tube opening and having
    an outer surface; and
  an upper rotator rotatably mounted around the sliding bracket; and
  a C-shaped self-lubricant bushing mounted around the outer surface of the sliding bracket between the upper rotator and the sliding bracket;
at least one upper brake cable mounted through the upper bearing assembly and embedded in the upper rotator; and
at least one spring corresponding to the at least one upper brake cable, mounted in the tube opening, mounted compressibly around the at least one upper brake cable and abutting the upper bearing assembly and the upper rotator.

2. The rotor brake as claimed in claim 1, wherein
the sliding bracket has
  a top end;
  a bottom end;
  an annular bracket groove defined around the top end of the sliding bracket; and
  an annular bracket flange protruding around the bottom end of the sliding bracket; and
the braking device further has
  a lower rotator rotatably mounted around the sliding bracket between the upper rotator and the bracket flange and abutting the bracket flange; and
  a C-shaped ring mounted securely in the bracket groove.

3. The rotor brake as claimed in claim 2, wherein
the lower rotator is annular and has
  an outer surface; and
  an inlaying groove longitudinally defined in the outer surface of the lower rotator and capable of aligning with the maintenance hole; and
the upper rotator is annular and has
  an outer surface; and
  at least one embedding groove corresponding to the at least one upper brake cable, longitudinally defined in the outer surface of the upper rotator, embedding in the at least one upper brake cable and capable of aligning with the maintenance hole.

4. The rotor brake as claimed in claim 3, wherein two upper brake cables are implemented.

5. The rotor brake as claimed in claim 2, wherein two upper brake cables are implemented.

6. The rotor brake as claimed in claim 1, wherein two upper brake cables are implemented.

* * * * *